Oct. 31, 1944.  S. SCHNELL  2,361,419
COMBINED AIR AND HYDRAULIC PRESSURE BRAKE ACTUATING SYSTEM
Filed Sept. 30, 1942  2 Sheets-Sheet 2

INVENTOR
S. SCHNELL
BY
ATTORNEY

Patented Oct. 31, 1944

2,361,419

UNITED STATES PATENT OFFICE 2,361,419

COMBINED AIR AND HYDRAULIC PRESSURE BRAKE ACTUATING SYSTEM

Steve Schnell, Kirkwood, Mo., assignor to Wagner Electric Corporation, St. Louis, Mo., a corporation of Delaware Application September 30, 1942, Serial No. 460,210

13 Claims. (Cl. 60—54.5)

My invention relates to fluid pressure actuating systems and more particularly to one employing both hydraulic pressure and air pressure.

One of the objects of my invention is to provide an improved fluid pressure actuating system in which a hydraulic system is caused to be actuated to develop high pressures by the operation of an air pressure system controlled by manually-developed lower hydraulic pressures.

Another object is to produce an improved actuating system in which small manually-developed hydraulic pressures can be employed to control air pressure to develop greater hydraulic pressures and particularly one which is so arranged that the greater developed pressure can be reduced and re-established without the use of the air pressure by merely reducing and re-establishing the manually-developed pressure employed to obtain the greater developed hydraulic pressure.

Still another object is to provide improved means for controlling a combined air pressure and hydraulic pressure actuating system which will result in a minimum use of compressed air and at the same time permit direct manual development of hydraulic actuating pressure in the event of failure of the air pressure.

Figure 1:
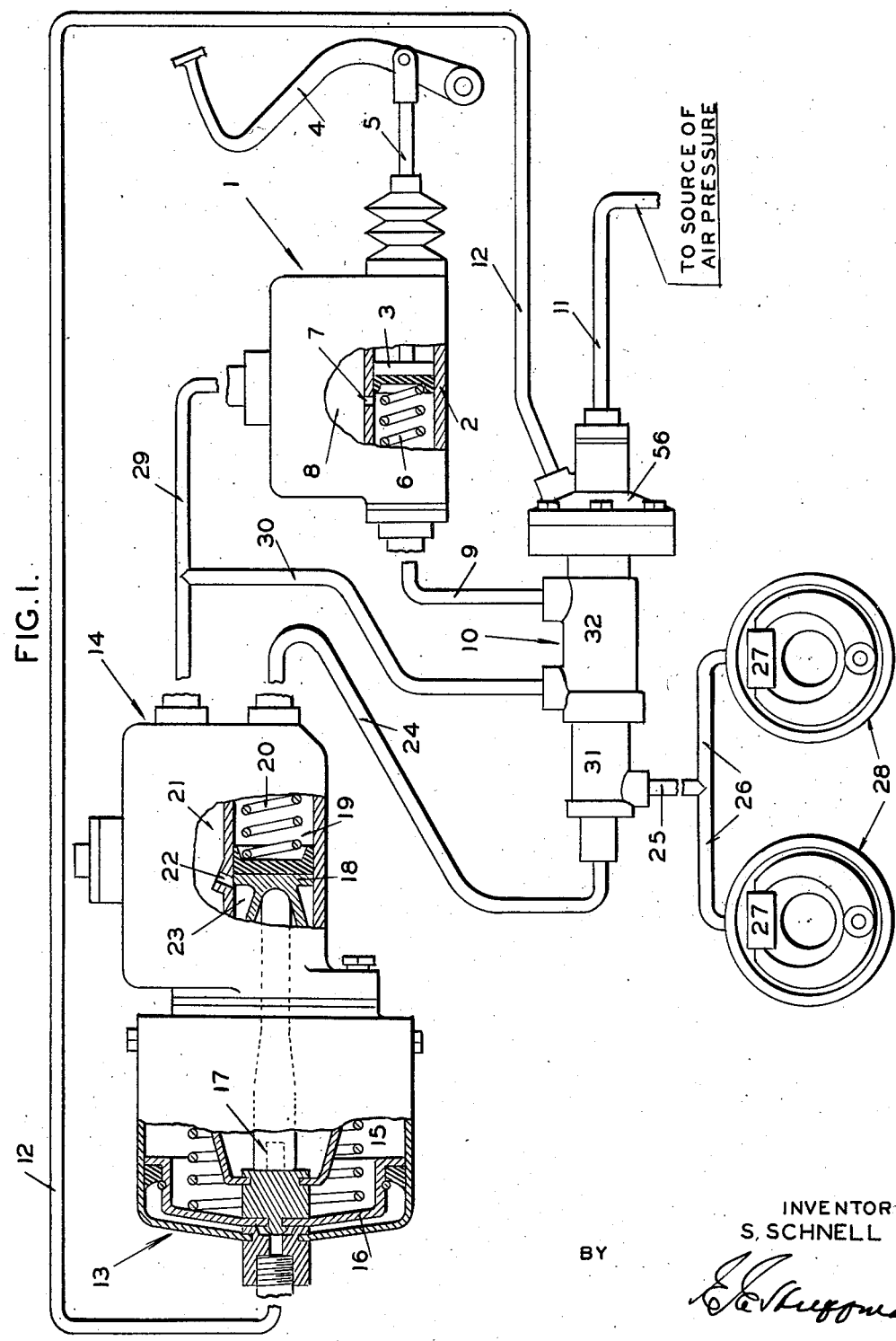
Figure 2:
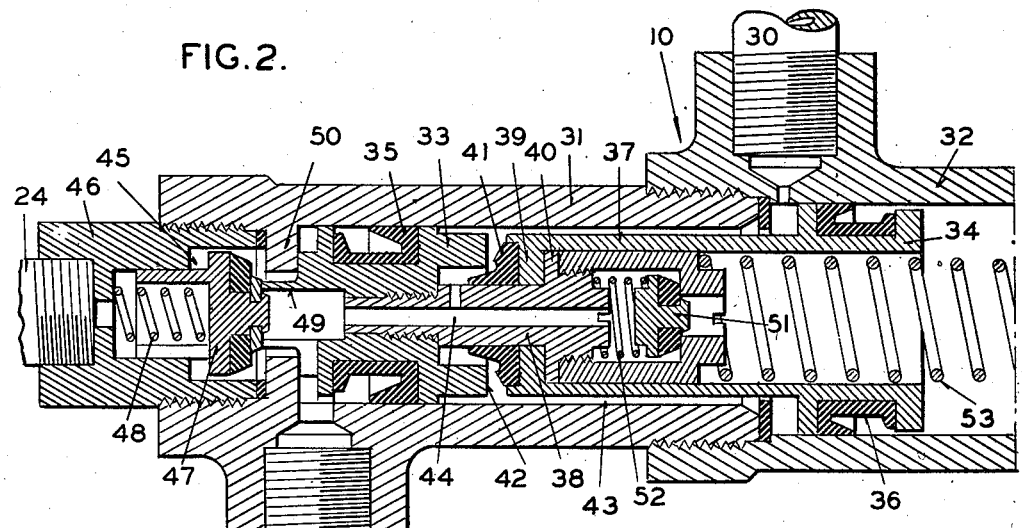
Figure 3:
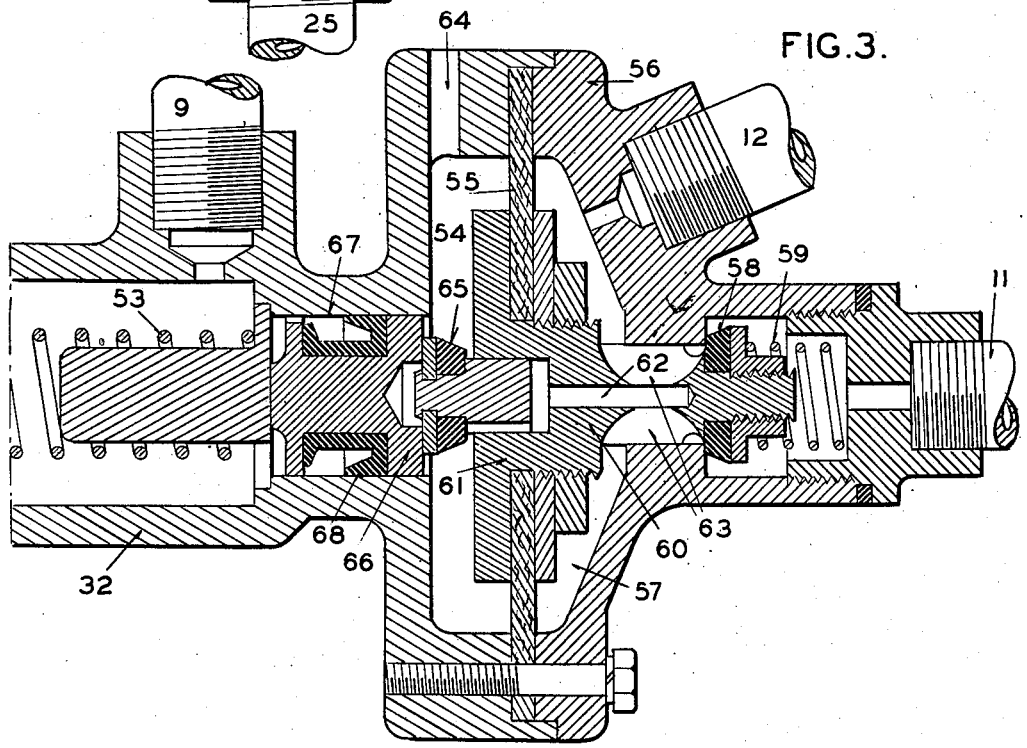

Other objects of my invention will become apparent from the following description taken in connection with the accompanying drawings in which Figure 1 is a schematic view of a combined hydraulic pressure and air pressure actuating system embodying my invention, parts being shown in section; and Figures 2 and 3 are enlarged sectional views of the pressure control valve means with Figure 2 showing the left end portion and Figure 3, the right end portion.

Referring in detail to the drawings and first to Figure 1, numeral 1 indicates a master cylinder device of well-known construction comprising a cylinder 2 in which a piston 3 is reciprocable, said piston being actuated by a pedal 4 connected thereto by a piston rod 5. The piston is biased to an inoperative position by a spring 6 and when in this position, it uncovers a port 7 for placing the portion of cylinder 2 ahead of the piston in communication with a reservoir 8. The outlet of the master cylinder is connected by a conduit 9 to a novel pressure control device generally indicated by the numeral 10 and shown in detail in Figures 2 and 3.

This pressure control device includes valve means for controlling air under pressure entering the device from a suitable source through conduit 11. A conduit 12 leads from the pressure control device to a power cylinder 13 which is employed to actuate a second master cylinder device 14. The power cylinder comprises a cylinder 15 in which is mounted a piston 16 connected by a piston rod 17 to the piston 18 of the master cylinder device 14. The piston 18 is mounted in cylinder 19 of the master cylinder device and is normally held in retracted position by a spring 20. The master cylinder device 14 differs from the master cylinder device 1 in that the piston, when in retracted position, does not uncover any porthole for placing the reservoir 21 in communication with the cylinder ahead of the piston. This reservoir 21, however, does communicate, by means of a port 22, with a chamber 23 at the rear of piston 18, thus enabling fluid to slip by the piston packing cup in the event there should be a tendency for the hydraulic fluid ahead of the piston to be under subatmospheric pressure.

The outlet of the master cylinder device 14 is connected by means of a conduit 24 and the pressure control device 10 to communicate with a conduit 25 and branch conduits 26 leading to fluid motors 27 which may be employed to actuate any device desired but are shown as actuating the brake shoes of brake assemblies 28. The reservoirs 8 and 21 of the two master cylinder devices are placed in communication with each other by a conduit 29, and a branch conduit 30 connects this conduit with the pressure control device 10. Branch conduit 30 provides means for the return flow of fluid to the reservoirs from the fluid motors 27, all of which will become apparent after an explanation of the pressure control device 10.

Referring to Figures 2 and 3, the pressure control device comprises two cylinders 31 and 32 screwed together in axial alignment, cylinder 31 being smaller than cylinder 32. Within cylinder 31 is a piston 33 and within cylinder 32 is a piston 34, these pistons being provided with suitable packing cups 35 and 36, respectively. Piston 34 carries a cylindrical extension 37 extending into cylinder 31 toward piston 33 and received in this extension is an extension 38 carried by piston 33. The extension 37 is provided with a flange 39 for cooperation with a flange 40 on extension 38 in order to limit the extent of separation of the two pistons. Surrounding extension 38 is an annular valve element 41 carried by extension 37, said valve element being adapted to cooperate with an annular valve seat 42 carried by piston 33. The extension 37 is of somewhat smaller diameter than cylinder 31 in which it projects, thus establishing a chamber 43 which is in constant communication with the previously referred to conduit 30 leading to the reservoirs of the two master cylinder devices. When the valve element 41 is unseated, chamber 43 communicates with a passage 44 extending through extension 38 and forming a by-pass through the pistons.

The left end of passage 44, as viewed in Figure 2, communicates with a chamber 45 formed in a connecting element 46 between cylinder 31 and previously referred to conduit 24 coming from the master cylinder device 14. A check valve element 47 is employed between chamber 45 and cylinder 31 and a spring 48 biases it toward seated position. This check valve element 47, however, is held unseated by a projecting portion 49 on the end of piston 33 but only in the event that piston 33 is abutting the outer end wall 50 of the cylinder 31. The passage 44 constantly communicates with the outer end of cylinder 31 to the left of piston 33 and this end is connected with the previously referred to conduit 25 leading to the brake actuating fluid motors. Cylinder 32 to the right of large piston 34 communicates with the right end of passage 44 through a check valve, element 51 of which is normally seated by a spring 52. This check valve prevents fluid from flowing from passage 44 and the left end of cylinder 31 to cylinder 32.

Piston 33 is biased to the left end of cylinder 31 by means of a spring 53 of predetermined strength, said spring being interposed between the right end of cylinder 32 and the extension 38. The previously referred to conduit 9 leading from the master cylinder device 1 communicates with the right end of cylinder 32, thus permitting fluid to flow from said master cylinder device to cylinder 32 and past the check valve 51 if such fluid is under sufficient pressure to unseat the check valve against any pressure which may be acting thereon in addition to the spring 52.

The outer end of cylinder 32 is provided with an enlargement to form a chamber 54 with a diaphragm 55 as one of the walls, said diaphragm being held in position by a cap 56 which forms a second chamber 57 on the other side of the diaphragm. Chamber 57 is connected to conduit 12 and also to conduit 11 coming from the source of air pressure. A control valve element 58 is associated with conduit 11 to control communication between conduits 11 and 12, said valve element being seated by a light spring 59. The valve element 58 is carried on an extension 60 of a member 61 attached to the diaphragm. A passage 62 and cut-outs 63 in the extension place chamber 57 in communication with chamber 54 which is in constant communication with the atmosphere through a passage 64. Passage 62 is controlled by a valve element 65 and when this valve element is closed, communication will be prevented between the two chambers. Valve element 65 is controlled by a piston 66 carried in a small cylinder 67 in the end portion of cylinder 32, said piston being acted upon by fluid under pressure in cylinder 32. A packing cup 68 prevents fluid under pressure from passing the piston.

In operation the system is filled with suitable hydraulic fluid, said fluid being contained in both master cylinders, their reservoirs, cylinders 31 and 32, fluid motors 27 and the hydraulic conduits connected thereto. When the system is inoperative, the parts of the various devices will be in the positions shown. The ratios of the areas of the two pistons 33 and 34 may be selected as desired. These areas determine the ratio between the manually-developed hydraulic pressure of the master cylinder device 1 and the hydraulic pressure applied to the brakes. If the pressure to be developed by the master cylinder device 1 is desired to be half of that effective in the brake fluid motors, then the effective area of piston 34 will be twice that of the effective area of piston 33. This ratio will be assumed in explaining the operation of the device.

When it is desired to apply the brakes, the master cylinder device 1 is caused to develop hydraulic pressure by actuation of the brake pedal. This will cause hydraulic pressure to be effective in cylinder 32 which will act on piston 34 to move it and extension 37 to the left, thereby seating valve element 41. Communication is now cut off between the master cylinder reservoirs and the fluid motors of the brakes. The hydraulic pressure in cylinder 32 also acts on piston 66 to move this piston to the right, thereby causing valve element 65 to be seated. Communication between chamber 57 and the atmosphere is now cut off. As pressure continues to be developed by the master cylinder device 1, piston 66 will continue to move to the right carrying with it element 61 and diaphragm 55. This will result in valve 58 being open so that air under pressure can flow from the source to the power cylinder thereby actuating the latter. During the opening of valve 58, check valve element 51 will not be unseated by the hydraulic pressure effective in cylinder 32 since spring 52 is of such strength in relation to the small area of the valve element as to permit sufficient build-up of pressure in cylinder 32 that piston 66 can be moved to open valve 58. As the power cylinder 13 is operated, piston 18 of the master cylinder device 14 will also be operated and consequently hydraulic pressure will be developed thereby and liquid forced out through conduit 24. This hydraulic pressure will be effective in fluid motors 25 since check valve 47 is held unseated by the position of piston 33 at the left end of its cylinder. Piston 66 is of such area that it will maintain the valve 58 unseated until such air pressure is developed in the power cylinder 13 that it will cause a hydraulic pressure to be effective in the fluid motors of the brake assemblies which is approximately twice that of the pressure manually developed by the master cylinder device 1. When this condition exists the air pressure acting upon the right side of diaphragm 55 will move the diaphragm to the left, thus closing valve 58. Valve 65, however, will remain seated by the hydraulic pressure acting upon piston 66. If additional hydraulic pressure is desired in the brake actuating fluid motors, additional pressure will be developed by the master cylinder device 1 and this will cause a re-opening of the valve 58 and the admission of additional air under pressure to the power cylinder, thus causing the master cylinder device 14 to be further actuated until the hydraulic pressure in fluid motors 27 is twice that of the hydraulic pressure manually developed by the master cylinder device 1 at which time valve 58 will again be closed.

If it is desired to release some of the hydraulic pressure effective in fluid motors 27, this can be accomplished without release of any of the air pressure which is effective in the power cylinder. When the pressure being developed by the master cylinder device 1 is lowered by a partial release of the pedal, the pressure in cylinder 32 will also be lowered. This will now cause the hydraulic pressure acting upon piston 33 to move pistons 33 and 34 to the right as a unit with the valve element 41 remaining seated. As this movement takes place, valve 47 will become closed under the action of its spring and thus prevent flow of any fluid from the master cylinder device 14 to cylinder 31 and then the hydraulic pressure in fluid motors 27 will be decreased due to the fact that piston 33, in moving to the right, increases the volume of the portion of the system in which the hydraulic pressure effective in the fluid motors is confined.

If it should be desired to restore the hydraulic pressure in the fluid motors to the value which was effective therein prior to the reduction, this can be done without the use of any additional air pressure from the source by merely redeveloping the hydraulic pressure of the master cylinder device 1 to the value which it had prior to reduction. When the master cylinder device 1 is actuated, pistons 33 and 34 will be moved to the left again until piston 33 abuts the end of its cylinder. It is noted that these two pistons act as compound pistons and thus the hydraulic pressure in the fluid motors will be restored without the use of air pressure and by only using such manual force as was originally used to place this hydraulic pressure in the fluid motors by the use of air pressure. During the restoration of the hydraulic pressure in the fluid motors the air pressure in the power cylinder is not disturbed.

If it should be desired to release the hydraulic pressure in the fluid motors of the brake assemblies, pedal 4 is completely released, thereby returning piston 3 to the position shown in Figure 1 and uncovering port 7. This will cause a drop in hydraulic pressure in cylinder 32 to atmospheric pressure. The hydraulic pressure acting upon valve element 41 will now cause unseating thereof, thus placing the fluid motors in communication with the reservoirs of the two master cylinders. Fluid can now flow back into these reservoirs. Since the pressure acting upon piston 66 is now relieved, air under pressure in chamber 57 and the power cylinder will cause unseating of valve element 65 and the exhausting of the air under pressure to atmosphere. Prior to the unseating of valve element 41, pistons 33 and 34 will move to the right as the pressure in cylinder 32 drops but after valve element 41 is unseated and the hydraulic pressure in the fluid motors is relieved, spring 53 will be effective to restore the pistons to their positions shown in Figure 2 with the valve element 41 remaining unseated.

Complete release of the brake pedal is not necessary to release the brakes as release will occur whenever the pressure in the master cylinder device 1 reaches such a low value that the pressure in the fluid motors working in connection with spring 53 can cause unseating of valve 41. The value of spring 53 will determine the point at which total release of the hydraulic pressure in the fluid motors will take place since this spring acts to decrease the fluid pressure acting on piston 33 to force it toward valve-seated position. In practice this is so calculated that the hydraulic pressure in cylinder 32 will be at a value sufficient to maintain such pressure in the fluid motors as to cause the brake shoes to be held in engagement with the drum.

In the event there should be failure of air pressure from the source, the brakes may be operated solely by manually-developed hydraulic pressure from the master cylinder device 1. Under such condtions the fluid pressure developed by the master cylinder device 1 would be effective in cylinder 32 to first seat valve element 41 and then as fluid pressure is built up, this cylinder will cause the unseating of check valve element 51. Fluid will now flow through passage 44 into the fluid motors of the brake assemblies. The hydraulic pressure developed in the fluid motors will be the same as that developed in the master cylinder device 1 as pistons 33 and 34 do not act as compounding pistons since piston 33 is abutting the end of its cylinder. When the hydraulic pressure effective in the fluid motors is desired to be decreased, such will not take place until the hydraulic pressure developed by the master cylinder device is lowered below one-half of the developed value. This is apparent since pistons 33 and 34 cannot move to the right until the force acting upon piston 33 is slightly greater than that acting upon piston 34. Further lowering of the hydraulic pressure in the master cylinder device will now result in the lowering of the hydraulic pressure in the motors. The hydraulic pressure in the motors can be restored by merely applying sufficient force on the pedal to again develop in the master cylinder device one-half the hydraulic pressure that was employed to place the hydraulic pressure in the fluid motors. When the brake pedal is retracted to a point where valve 41 becomes unseated or to a fully retracted position where port 7 is uncovered, the hydraulic pressure in the motors will be released in a manner already described.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure actuating system, a fluid motor, air pressure actuated hydraulic pressure developing means for actuating the fluid motor, means for controlling the operation of the last named means by manually developed hydraulic pressure which is lower than the hydraulic pressure caused to be effective in the motor by said first named means, and means operable independently of operation of the air pressure actuated developing means and comprising a compounding device for varying the hydraulic pressure in the motor below the pressure which was caused to be effective therein by the first named means, said last named means being controlled solely by varying the manually developed pressure below its said lower pressure.

2. In a fluid pressure actuating system, a fluid motor, air pressure actuated hydraulic pressure developing means for actuating the fluid motor, means for controlling the operation of the last named means by manually developed hydraulic pressure which is lower than the hydraulic pressure caused to be effective in the motor by said first named means; and means operable independently of the first named means for reducing and re-establishing the pressure which was caused to be effective in the motor by said first named means, said last named means comprising means controllable by a reduction and re-establishment of said manually developed lower pressure.

3. In a fluid pressure actuating system, a fluid motor, air pressure actuated hydraulic pressure developing means for actuating the fluid motor, means for controlling the operation of the last named means by manually developed hydraulic pressure which is lower than the hydraulic pressure caused to be effective in the motor by said first named means, and means operable independently of the first named means and by a reduction and re-establishment of said manually developed lower pressure for reducing and re-establishing the pressure which was caused to be effective in the motor by said first named means, said last named means comprising two pistons of different diameter with the smaller piston subjected to the hydraulic pressure developed by the air pressure actuated hydraulic pressure developing means and the larger piston subjected to the manually developed hydraulic pressure.

4. In a fluid pressure actuating system, a fluid motor, air pressure actuated hydraulic pressure developing means for actuating the fluid motor, means for controlling the operation of the last named means by manually developed hydraulic pressure which is lower than the hydraulic pressure caused to be effective in the motor by said first named means, means operable independently of the first named means and by a reduction and re-establishment of said manually developed lower pressure for reducing and re-establishing the pressure which was caused to be effective in the motor by said first named means, said last named means comprising two pistons of different diameter with the smaller piston subjected to the hydraulic pressure developed by the air pressure actuated hydraulic pressure developing means and the larger piston subjected to the manually developed hydraulic pressure, and a valve controlled by-pass for said pistons permitting manually developed hydraulic pressure to be effective in the motor in the event the air pressure actuated hydraulic pressure developing means becomes inoperative.

5. In a fluid pressure actuating system, a fluid motor, air pressure actuated hydraulic pressure developing means for actuating the fluid motor, means for controlling the operation of the last named means by manually developed hydraulic pressure which is lower than the hydraulic pressure caused to be effective in the motor by said first named means, means comprising a compounding device operable independently of the first named means and by a reduction and re-establishment of said manually developed lower pressure for reducing and re-establishing the pressure which was caused to be effective in the motor by said first named means, and means for causing manually developed hydraulic pressure to be effective in the motor in the event of failure of the air pressure actuated hydraulic pressure developing means.

6. In a fluid pressure actuating system, a fluid motor to be actuated, a hydraulic master cylinder device connected to the motor, a power cylinder for actuating the master cylinder device, a source of air pressure for the power cylinder, means comprising a valve for controlling the flow of air under pressure from the source to the power cylinder, a manually actuated hydraulic master cylinder device, means for opening the control valve by hydraulic pressure developed by the manually actuated master cylinder, and means comprising a compounding device operable by the lowering of the manually developed pressure for lowering the hydraulic pressure which was caused to be effective in the motor by the operation of the power cylinder and operable by the restoration of said manually developed pressure for re-establishing said pressure in the fluid motor as determined by the operation of the power cylinder, said means when being operated requiring no change in the air pressure in the power cylinder.

7. In a fluid pressure actuating system, a fluid motor to be actuated, a hydraulic master cylinder device connected to the motor, a power cylinder for actuating the master cylinder device, a source of air pressure for the power cylinder, means comprising a valve for controlling the flow of air under pressure from the source to the power cylinder, a manually actuated hydraulic master cylinder device, means for opening the control valve by hydraulic pressure developed by the manually actuated master cylinder, means comprising a compounding device operable by the lowering of the manually developed pressure for lowering the hydraulic pressure which was caused to be effective in the motor by the operation of the power cylinder and operable by the restoration of said manually developed pressure for re-establishing said pressure in the fluid motor as determined by the operation of the power cylinder, and means for permitting hydraulic pressure developed by the manually actuated master cylinder to by-pass the compounding device and be effective in the fluid motor in the event the first named master cylinder fails to be actuated.

8. In a fluid pressure actuating system, a fluid motor to be actuated, a hydraulic master cylinder device connected to the motor, a power cylinder for actuating the master cylinder device, a source of air pressure for the power cylinder, means comprising a valve for controlling the flow of air under pressure from the source to the power cylinder, a manually actuated hydraulic master cylinder device, means for opening the control valve by hydraulic pressure developed by the manually actuated master cylinder, and means operable by the lowering of the manually developed pressure for lowering the hydraulic pressure which was caused to be effective in the motor by the operation of the power cylinder and operable by the restoration of said manually developed pressure for re-establishing said pressure in the fluid motor as determined by the operation of the power cylinder, said last named means being operable independently of operation of the power cylinder and comprising two pistons of different sizes with the smaller acted upon by the hydraulic pressure in the motor and the larger acted upon by the hydraulic pressure developed by the manually actuated master cylinder.

9. In a fluid pressure actuating system, a fluid motor to be actuated, a hydraulic master cylinder device connected to the motor, a power cylinder for actuating the master cylinder device, a source of air pressure for the power cylinder, means comprising a valve for controlling the flow of air under pressure from the source to the power cylinder, a manually-actuated hydraulic master cylinder device, means for opening the control valve by hydraulic pressure developed by the manually-actuated master cylinder, means operable by the lowering of the manually developed pressure for lowering the hydraulic pressure caused to be effective in the motor by the operation of the power cylinder and operable by the restoration of said manually developed pressure for re-establishing said pressure in the fluid motor as determined by the operation of the power cylinder, and means for cutting off communication between the power cylinder operated device and the fluid motor during the operation of the last named means.

10. In a fluid pressure actuating system, a fluid motor to be actuated, a hydraulic master cylinder device having a reservoir and being connected to the motor, a power cylinder for actuating the master cylinder device, a source of air pressure for the power cylinder, means comprising a valve for controlling the flow of air under pressure from the source to the power cylinder, a manually actuated hydraulic master cylinder device having a reservoir, means for opening the control valve by hydraulic pressure developed by the manually actuated master cylinder, means comprising a compounding device operable by a lowering of the manually developed pressure for lowering the hydraulic pressure which was caused to be effective in the motor by the operation of the power cylinder and operable by the restoration of said manually developed pressure for re-establishing said pressure in the fluid motor as determined by the operation of the power cylinder, and means for releasing hydraulic fluid from the motor to the reservoirs when the manually developed hydraulic pressure is lowered below a predetermined value.

11. In a fluid pressure actuating system, a fluid motor to be actuated, a hydraulic master cylinder device connected to the motor, a power cylinder for actuating the master cylinder device, a source of air pressure for the power cylinder, means comprising a valve for controlling the flow of air under pressure from the source to the power cylinder, a manually actuated hydraulic master cylinder device, means for opening the control valve by hydraulic pressure developed by the manually actuated master cylinder, means comprising a compounding device operable by a lowering of the manually developed pressure for lowering the hydraulic pressure which was caused to be effective in the motor by the operation of the power cylinder and operable by the restoration of said manually developed pressure for re-establishing said pressure in the fluid motor as determined by the operation of the power cylinder, a hydraulic fluid containing reservoir, and means comprising a valve for placing the motor in communication with the reservoir to thereby release hydraulic pressure when the manually developed hydraulic pressure is released.

12. In a fluid pressure actuating system, a fluid motor to be actuated, a hydraulic master cylinder device connected to the motor, a power cylinder for actuating the master cylinder device, a source of air pressure for the power cylinder, means comprising a valve for controlling the flow of air under pressure from the source to the power cylinder, a manually actuated hydraulic master cylinder device, a reservoir therefor, means for opening the control valve by hydraulic pressure developed by the manually actuated master cylinder, means comprising conduit means and a normally closed check valve for permitting hydraulic pressure developed by the manually actuated master cylinder to pass in one direction only to the fluid motor and be effective therein in the event the first named master cylinder fails to be actuated, said check valve being so arranged as to be opened only in the event the hydraulic pressure developed by the manually actuated master cylinder is greater than the hydraulic pressure effective in the fluid motor, and means comprising valve means and conduit means independent of the first named conduit means for permitting release of the fluid pressure in the motor and its return directly to the reservoir without passing through the manually actuated master cylinder device when said device is released.

13. In a fluid pressure actuating system, a fluid motor to be actuated, a hydraulic master cylinder device connected to the motor, a power cylinder for actuating the master cylinder device, a source of air pressure for the power cylinder, means comprising a valve for controlling the flow of air under pressure from the source to the power cylinder, a manually actuated hydraulic master cylinder device having a reservoir, means for controlling the opening of the control valve by hydraulic pressure developed by the manually actuated master cylinder, two axially aligned pistons of different sizes mounted for relative movement, the smaller of said pistons being subject to the fluid pressure in the motor and the larger of said pistons being subject to the fluid pressure developed by the manually actuated master cylinder device, stop means for the pistons to limit their movement in the direction of the force created by the manually developed hydraulic pressure, and means comprising a valve controlled by the relative movement of said pistons for controlling communication between the motor and the reservoir.

STEVE SCHNELL.